US009726901B2

(12) United States Patent
Porter

(10) Patent No.: US 9,726,901 B2
(45) Date of Patent: Aug. 8, 2017

(54) EXTENDABLE EYEGLASSES AND METHOD OF USE

(71) Applicant: VisOptical, LLC, Fenton, MO (US)

(72) Inventor: David R. Porter, St. Louis, MO (US)

(73) Assignee: VISOPTICAL, LLC, Fenton, MO (US)

( * ) Notice: Subject to any disclaimer, the term of this patent is extended or adjusted under 35 U.S.C. 154(b) by 132 days.

(21) Appl. No.: 14/774,929

(22) PCT Filed: Dec. 2, 2013

(86) PCT No.: PCT/US2013/072630
§ 371 (c)(1),
(2) Date: Sep. 11, 2015

(87) PCT Pub. No.: WO2014/088953
PCT Pub. Date: Jun. 12, 2014

(65) Prior Publication Data
US 2016/0018669 A1   Jan. 21, 2016

Related U.S. Application Data

(63) Continuation of application No. 13/705,887, filed on Dec. 5, 2012, now Pat. No. 8,915,586.

(51) Int. Cl.
G02C 5/08 (2006.01)
G02C 5/00 (2006.01)
G02C 3/04 (2006.01)
G02C 5/14 (2006.01)
G02C 5/20 (2006.01)
G02C 5/22 (2006.01)
G02C 3/00 (2006.01)

(52) U.S. Cl.
CPC ............... *G02C 5/006* (2013.01); *G02C 3/04* (2013.01); *G02C 5/143* (2013.01); *G02C 5/20* (2013.01); *G02C 5/22* (2013.01); *G02C 3/006* (2013.01); *G02C 2200/02* (2013.01); *G02C 2200/04* (2013.01)

(58) Field of Classification Search
CPC ............. G02C 5/22; G02C 5/006; G02C 5/08
USPC ................................ 351/63, 124, 153; 2/454
See application file for complete search history.

(56) References Cited

U.S. PATENT DOCUMENTS

| 1,899,664 A | 2/1933 | Blocker |
| 1,936,319 A | 11/1933 | Wingate |
| 2,071,331 A | 2/1937 | Callahan |
| 2,117,383 A | 5/1938 | Wells |
| 2,117,384 A | 5/1938 | Wells |
| 2,117,385 A | 5/1938 | Wells |

(Continued)

FOREIGN PATENT DOCUMENTS

| EP | 0056822 A1 | 8/1982 |
| FR | 737885 A | 12/1932 |
| GB | 612577 A | 11/1948 |

Primary Examiner — Hung Dang
(74) Attorney, Agent, or Firm — Armstrong Teasdale LLP

(57) ABSTRACT

An eyeglass apparatus comprises first and second eyeglass portions, each having a connector portion and a lens portion. The eyeglass apparatus is configured to transition between stowed and extended configurations. When the eyeglass apparatus is in the stowed configuration, the lens portions overlie one another. When the eyeglass apparatus is in the extended configuration, the lens portions are in a non-overlying configuration.

28 Claims, 18 Drawing Sheets

(56) References Cited

U.S. PATENT DOCUMENTS

| | | |
|---|---|---|
| 3,361,514 A | 1/1968 | Davis |
| 4,367,929 A | 1/1983 | Fortini |
| 4,707,088 A | 11/1987 | Tabacchi |
| 4,840,476 A | 6/1989 | Rooney |
| 4,976,531 A | 12/1990 | Kahaney |
| 5,007,728 A | 4/1991 | Magorien |
| 5,208,616 A | 5/1993 | Chang |
| 5,448,317 A | 9/1995 | Huang |
| 5,532,766 A | 7/1996 | Mateer et al. |
| 5,633,692 A | 5/1997 | Schleger et al. |
| 5,937,681 A | 8/1999 | Myhr et al. |
| 6,017,119 A | 1/2000 | Huang |
| 6,053,612 A | 4/2000 | MacIntosh, Jr. et al. |
| 6,315,408 B1 | 11/2001 | Huang |
| 6,406,144 B1 | 6/2002 | Waters |
| 6,709,127 B2 | 3/2004 | Lu |
| D492,712 S | 7/2004 | Holmes et al. |
| 6,783,236 B2 | 8/2004 | Chou |
| 7,165,838 B1 | 1/2007 | Sapp |
| 7,399,077 B2 | 7/2008 | McDermott |
| 7,455,402 B2 | 11/2008 | Gerber et al. |
| 7,651,217 B2 | 1/2010 | Welchel et al. |
| 8,833,933 B1 * | 9/2014 | Huang .................. G02C 5/006 2/454 |
| 2004/0032652 A1 | 2/2004 | Holmes et al. |
| 2004/0100615 A1 | 5/2004 | Conner |
| 2004/0141148 A1 | 7/2004 | Chou |
| 2005/0253998 A1 | 11/2005 | McDermott et al. |
| 2007/0132938 A1 | 6/2007 | Huang |
| 2008/0002143 A1 | 1/2008 | McDermott et al. |
| 2008/0036962 A1 | 2/2008 | Alitowski |
| 2010/0073625 A1 | 3/2010 | Engstrom |
| 2010/0073626 A1 | 3/2010 | Engstrom |
| 2012/0162597 A1 | 6/2012 | Porter |

* cited by examiner

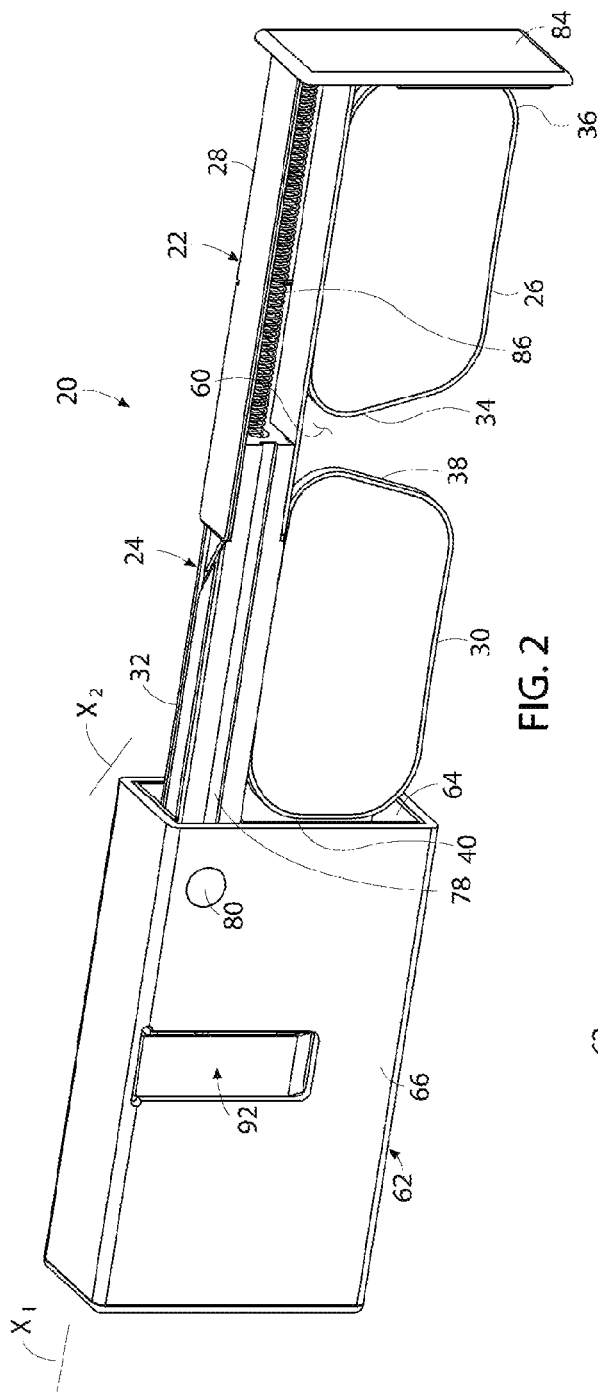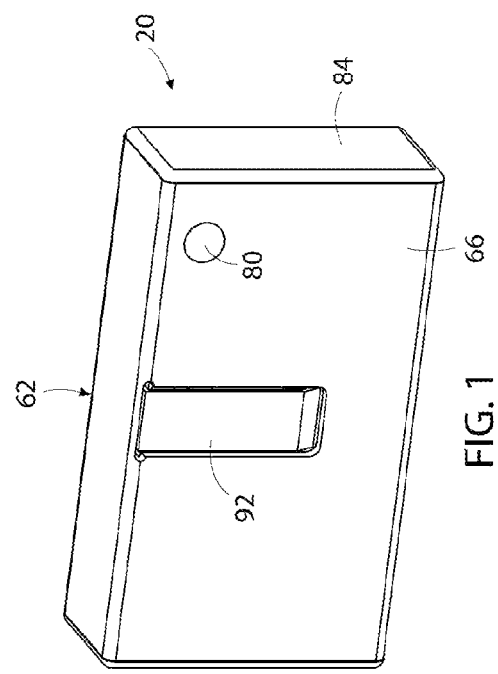

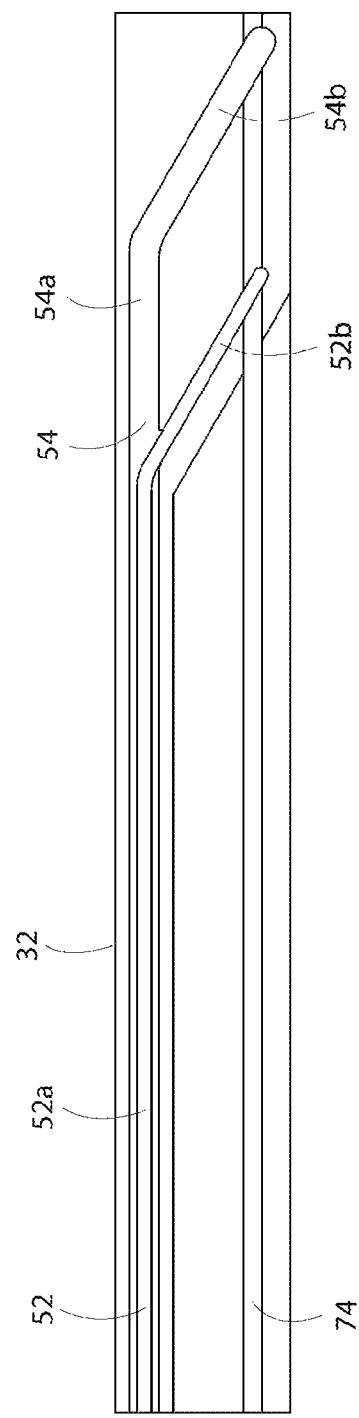

EXTENDABLE EYEGLASSES AND METHOD OF USE

CROSS-REFERENCE TO RELATED APPLICATIONS

This application is a National Stage Entry of PCT/US2013/072630 filed Dec. 2, 2013, which is a Continuation of U.S. patent application Ser. No. 13/705,887 filed Dec. 5, 2012, now U.S. Pat. No. 8,915,586, the contents of which are hereby expressly incorporated by reference in theft entireties.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains generally to eyeglasses, and more particularly to extendable eyeglasses.

General Background

People who use eyeglasses for only certain activities (e.g., reading) often keep their eyeglasses in their pockets, carrying bags or purses. Conventional eyeglasses are relatively bulky and may become damaged.

SUMMARY OF THE INVENTION

In one aspect of the invention, an eyeglass apparatus comprises a first eyeglass portion and a second eyeglass portion. The first eyeglass portion comprises a first lens portion, a first connector portion operatively coupled to the first lens portion, and a first link. The second eyeglass portion comprises a second lens portion, a second connector portion operatively coupled to the second lens portion, and a second link. The first connector portion at least partially defines a first channel, and the second connector portion at least partially defines a second channel. The first link is pivotally connected to the first connector portion and slideably connected to the second channel. Likewise, the second link is pivotally connected to the second connector portion and slideably connected to the first channel. The first and second links operatively connect the first and second connector portions to each other in a manner permitting the eyeglass apparatus to transition between a stowed configuration and an extended configuration. The first and second lens portions overlaying each other when the eyeglass apparatus is in the stowed configuration. The first and second lens portions are adjacent each other and non-overlying when the eyeglass apparatus is in the extended configuration.

Another aspect of the invention pertains to first and second lanyard clips for an eyeglass apparatus that has first and second temple portions. Each of the lanyard clips is adapted and configured to be connected to a pliable lanyard. Each of the lanyard clips is also configured and adapted to releasably snap-fit to at least one of the first and second temple portions.

Further features and advantages of the present invention, as well as the operation of the invention, are described in detail below with reference to the accompanying drawings.

BRIEF DESCRIPTION OF THE DRAWINGS

FIG. 1 is a perspective view of an embodiment of an eyeglass apparatus of the present invention in a stowed configuration.

FIG. 2 is a perspective view of the eyeglass apparatus of FIG. 1 in an extended configuration.

FIG. 4D is a top plan view of the second eyeglass portion of FIGS. 4A-4C.

Figure 3A:
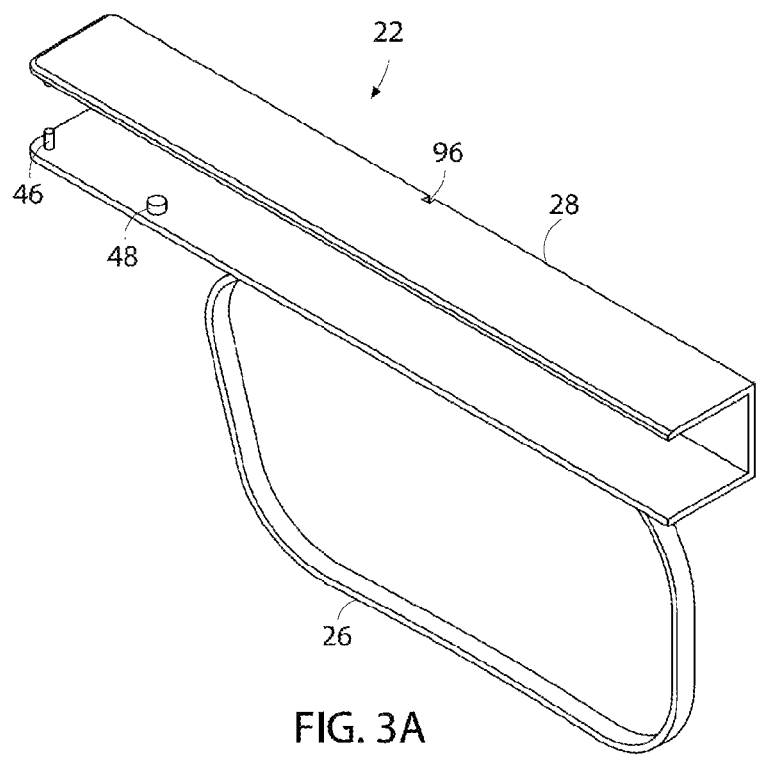
FIG. 3A is an upper rear perspective view of a first eyeglass portion of the eyeglass apparatus of FIGS. 1 and 2.

Reference numerals in the written specification and in the drawing figures indicate corresponding items.

DESCRIPTION OF THE PREFERRED EMBODIMENT

Referring first to FIGS. 1 and 2 of the drawings, an exemplary eyeglass apparatus of the present invention is generally indicated by reference numeral 20. The eyeglass apparatus 20 comprises a first eyeglass portion, generally indicated at 22, and a second eyeglass portion, generally indicated at 24. The first eyeglass portion 22 comprises a first lens portion 26 and a first connector portion 28. The second eyeglass portion 24 comprises a second lens portion 30 and a second connector portion 32. The first lens portion 26 is operatively coupled to the first connector portion 28 and is preferably fixed to the first connector portion such that the first lens portion and the first connector portion move as a single member. The second lens portion 30 is operatively coupled to the second connector portion 32 and is preferably fixed to the second connector portion such that the second lens portion and the second connector portion move as a single member. Preferably, the lens portions 26, 30 constitute corrective lens portions configured to correct impaired vision. More preferably the lens portions 26, 30 are configured to correct farsightedness or presbyopia. The lens portions 26, 30 may be convex lens portions (e.g., plano-convex, double-convex, or concavo-convex lenses). The first lens portion 26 includes a medial edge portion 34 and a lateral edge portion 36 generally opposite the medial edge portion 34. The second lens portion 30 includes a medial edge portion 38 and a lateral edge portion 40 generally opposite the medial edge portion 38.

The first and second connector portions 28, 32 of the first and second eyeglass portions 22, 24 are mechanically connected to one another in a manner permitting the eyeglass apparatus 20 to transition between a stowed configuration (shown in FIG. 1) and an extended configuration (shown in FIG. 2). The connection of the first and second connector portions 28, 32 is such that when the eyeglass apparatus 20 is in the stowed configuration: the first and second lens portions 26, 30 overlie one another; the medial edge portion 34 of the first lens portion is closer to the lateral edge portion 40 of the second lens portion than to the medial edge portion 38 of the second lens portion; and the lateral edge portion 36 of the first lens portion is closer to the medial edge portion 38 of the second lens portion than to the lateral edge portion 40 of the second lens portion. The connection of the first and second connector portions 28, 32 is such that when the eyeglass apparatus 20 is in the extended configuration, the first and second lens portions 26, 30 are in a non-overlying configuration with the medial edge portions 34, 38 of the first and second lens portions being between the lateral edge portion 36 of the first lens portion and the lateral edge portion 40 of the second lens portion.

Figure 3B:
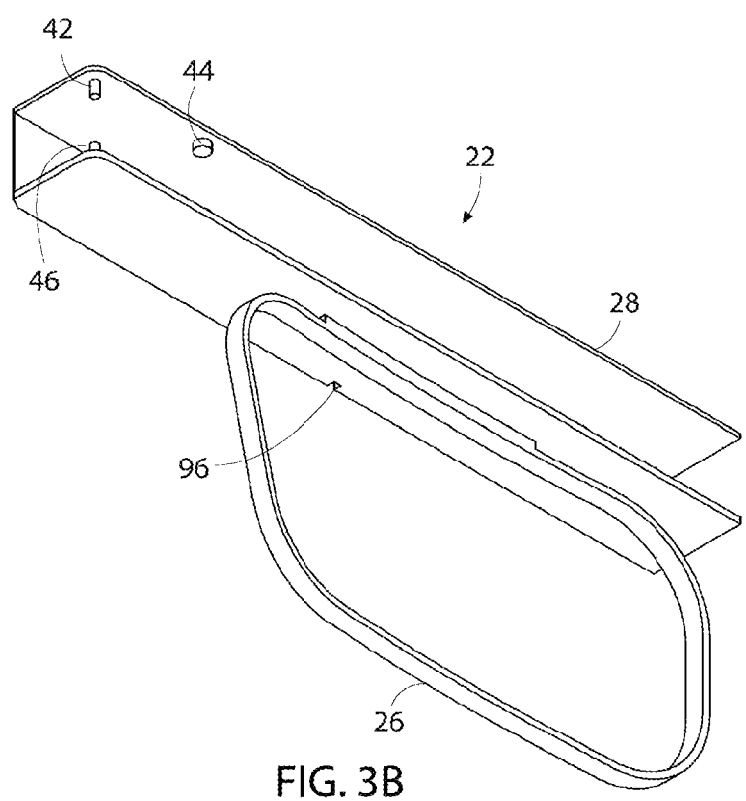
FIG. 3B is a lower rear perspective view of the first eyeglass portion of FIG. 3A.
Figure 3C:
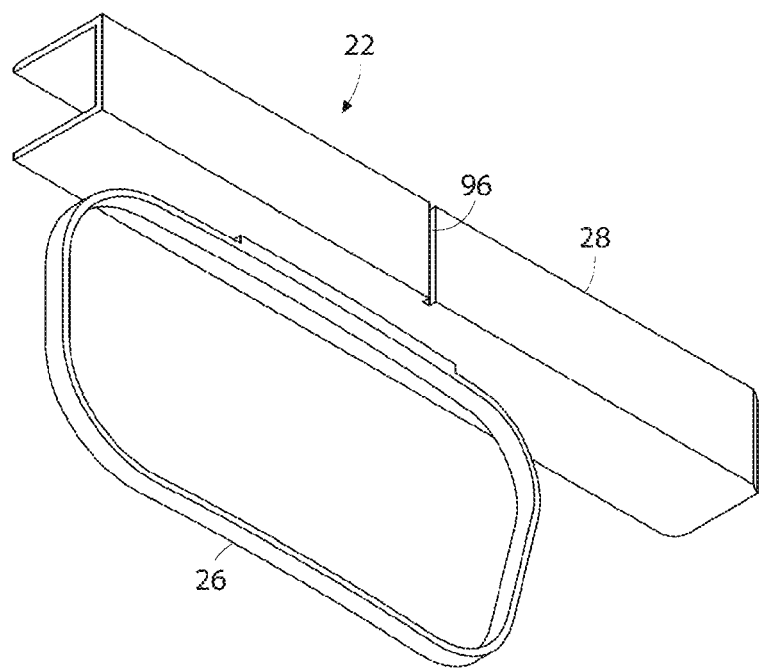
FIG. 3C is a lower front perspective view of the first eyeglass portion of FIGS. 3A and 3B.
Figure 4A:
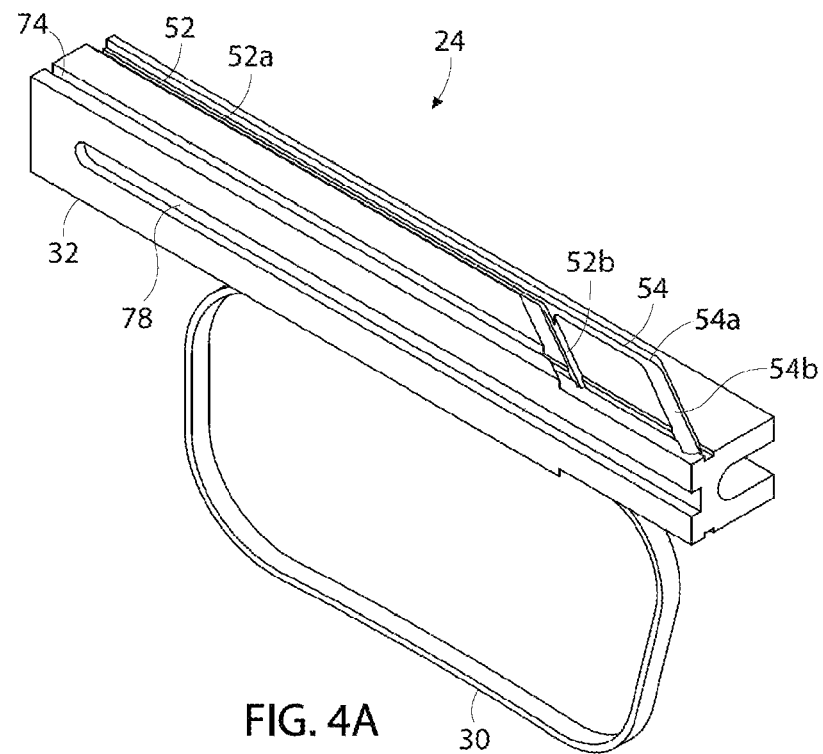
FIG. 4A is an upper rear perspective view of a second eyeglass portion of the eyeglass apparatus of FIGS. 1 and 2.
Figure 4B:
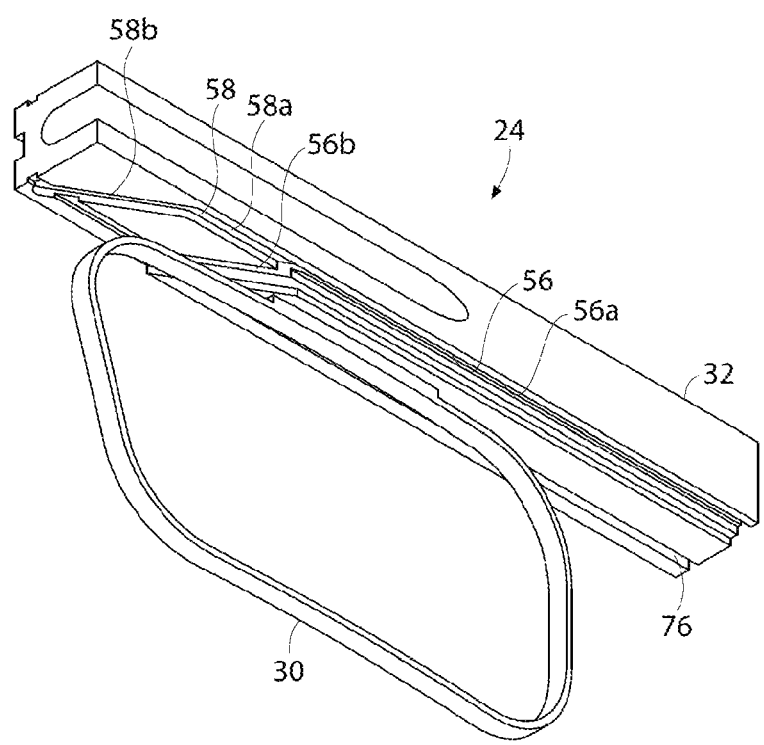
FIG. 4B is a lower front perspective view of the second eyeglass portion of FIG. 4A.
Figure 4C:
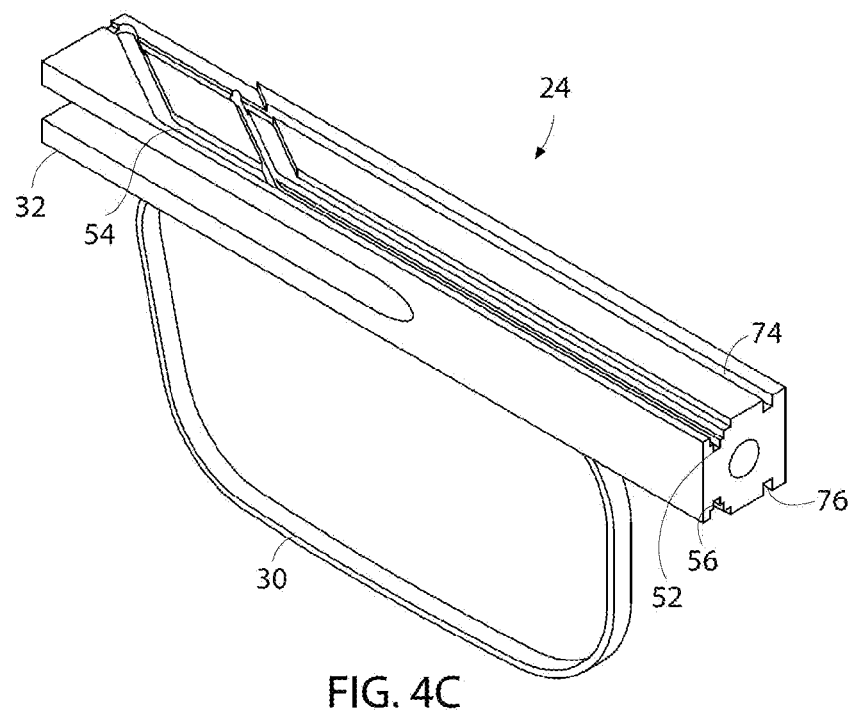
FIG. 4C is an upper front perspective view of the second eyeglass portion of FIGS. 4A and 4B.
Figure 5:
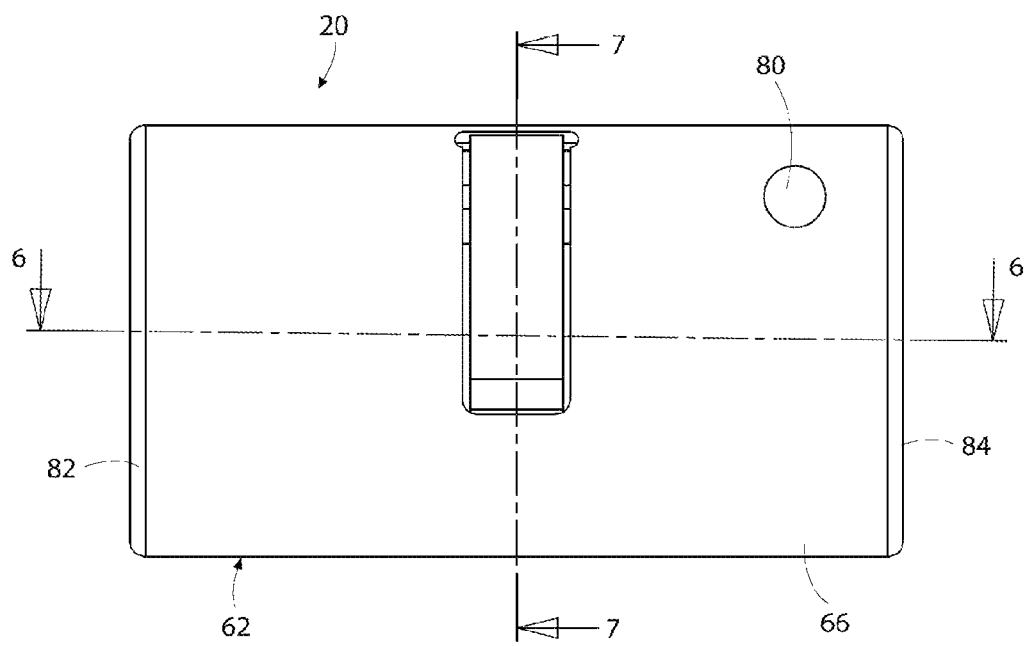
FIG. 5 is a rear elevational view of the eyeglass apparatus of FIG. 1, with the eyeglass apparatus in the stowed configuration.

In the preferred embodiment, the first and second connector portions 28, 32 are mechanically connected to one another via guide pins and guide channels. In particular and with reference to FIGS. 3A-3C, the first connector portion 28 includes first and second upper guide pins 42, 44, and first and second lower guide pins 46, 48. The first and second upper guide pins 42, 44 project downward from an upper portion of the first connector portion 28, and the first and second lower guide pins 46, 48 extend upward from a lower portion of the first connector portion. Referring to FIGS. 4A-4D, the second connector portion 32 includes first and second upper guide channels 52, 54 in a top surface of the second connector portion, and first and second lower guide channels 56, 58 in a bottom surface of the second connector portion. The guide pins and guide channels are shaped and configured such that as the eyeglass apparatus 20 transitions between the stowed configuration and the extended configuration, the first and second upper guide pins 42, 44 ride in the first and second upper guide channels 52, 54, respectively, and the first and second lower guide pins 46, 48 ride in the first and second lower guide channels 56, 58, respectively. In particular, the first upper guide pin 42 and the first lower guide pin 46 are longer and of a smaller diameter than the second upper guide pin 44 and the second lower guide pin 48, respectively. Likewise, the first upper guide channel 52 and the first lower guide channel 56 are deeper and narrower than the second upper guide channel 54 and the second lower guide channel 58, respectively. Each of the channels 52, 54, 56, 58 includes at least a laterally extending portion 52a, 54a, 56a, 58a, respectively, and an obliquely extending portion 52b, 54b, 56b, 58b, respectively. The laterally extending portions 52a, 54a, 56a, 58a are generally straight and generally parallel to one another. The obliquely extending portions 52b, 54b, 56b, 58b, are generally straight and generally parallel to one another. The corresponding obliquely extending portion and laterally extending portion of each channel form an oblique angle (e.g., 150□).

Figure 6:
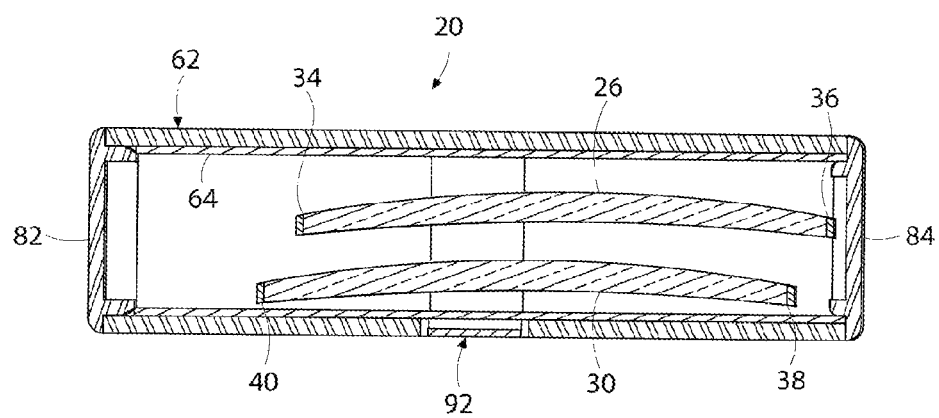
FIG. 6 is a cross-sectional view of the eyeglass apparatus of FIG. 1 taken along the plane of line 6-6 of FIG. 5.

Referring to FIGS. 5-8, when the eyeglass apparatus 20 is in the stowed configuration the first and second lens portions 26, 30 overlie one another. In this embodiment, the first lens portion 26 overlaps the second lens portion 30 when the eyeglass apparatus 20 is in the stowed configuration. In other words, the first and second lens portions 26, 30 are not laterally aligned when the eyeglass apparatus 20 is in the stowed configuration. But it is to be understood that an alternative eyeglass apparatus could be configured such that the first and second lens portions laterally align when the alternative eyeglass apparatus is in its stowed configuration without departing from the scope of the invention. Referring to FIG. 6, when the eyeglass apparatus 20 is in the stowed configuration: the medial edge portion 34 of the first lens portion 26 is closer to the lateral edge portion 40 of the second lens portion 30 than to the medial edge portion 38 of the second lens portion; and the lateral edge portion 36 of the first lens portion 26 is closer to the medial edge portion 38 of the second lens portion 30 than to the lateral edge portion 40 of the second lens portion.

Figure 7:
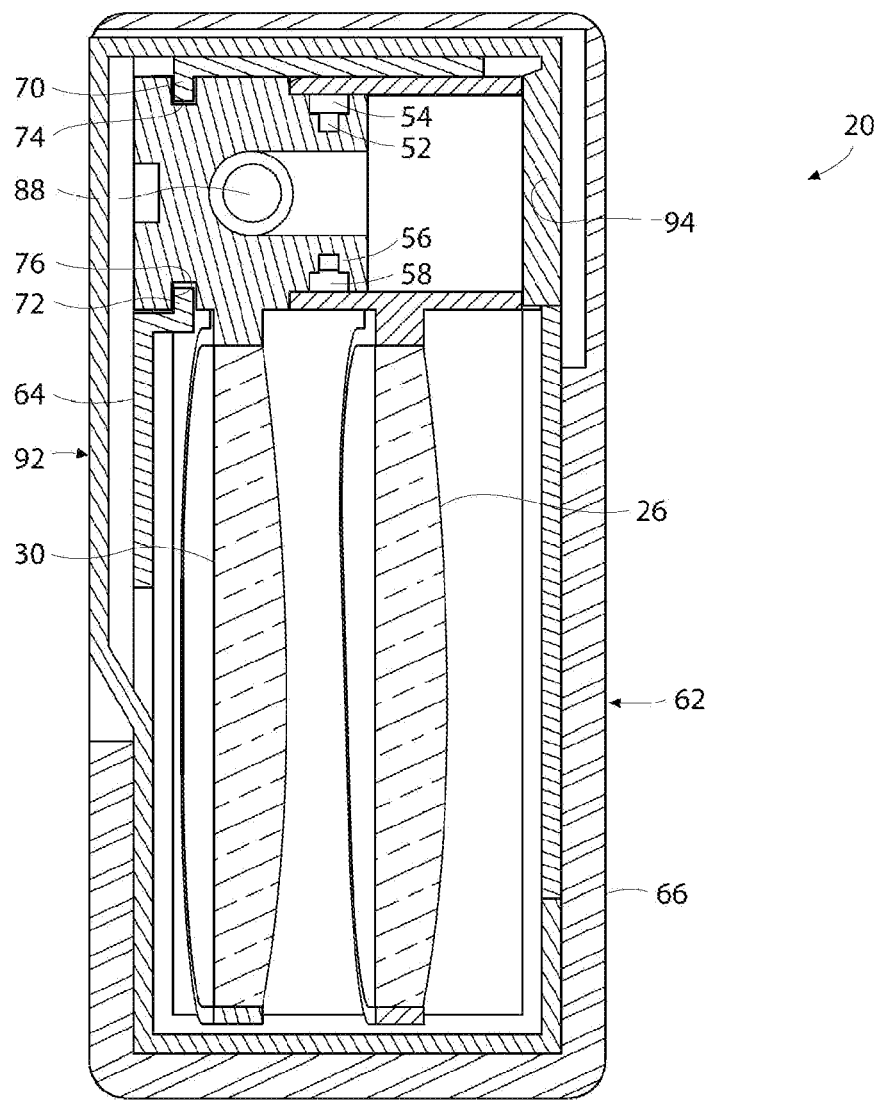
FIG. 7 is a cross-sectional view of the eyeglass apparatus of FIG. 1 taken along the plane of line 7-7 of FIG. 5, the eyeglass apparatus being shown with a locking mechanism in a locked position.
Figure 8:
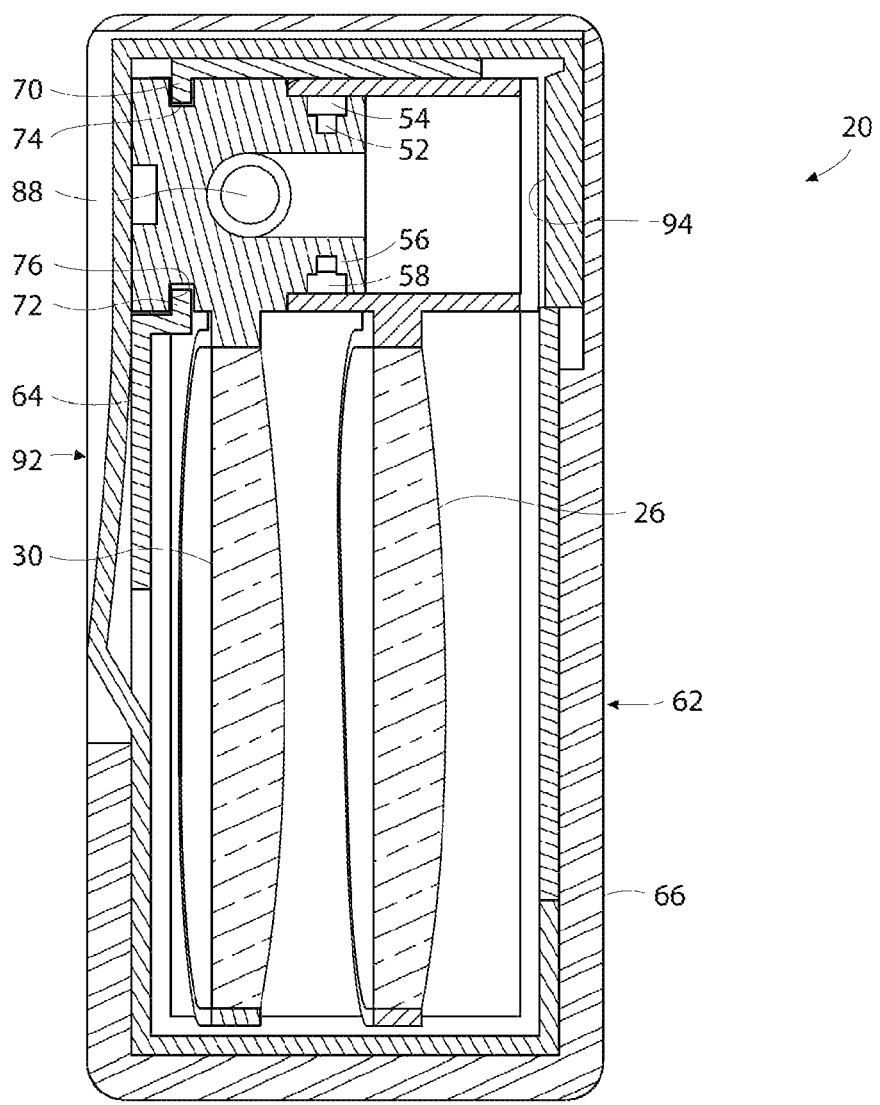
FIG. 8 is a cross-sectional view similar to that of FIG. 7 but shown with the locking mechanism in an unlocked position.
Figure 9A:
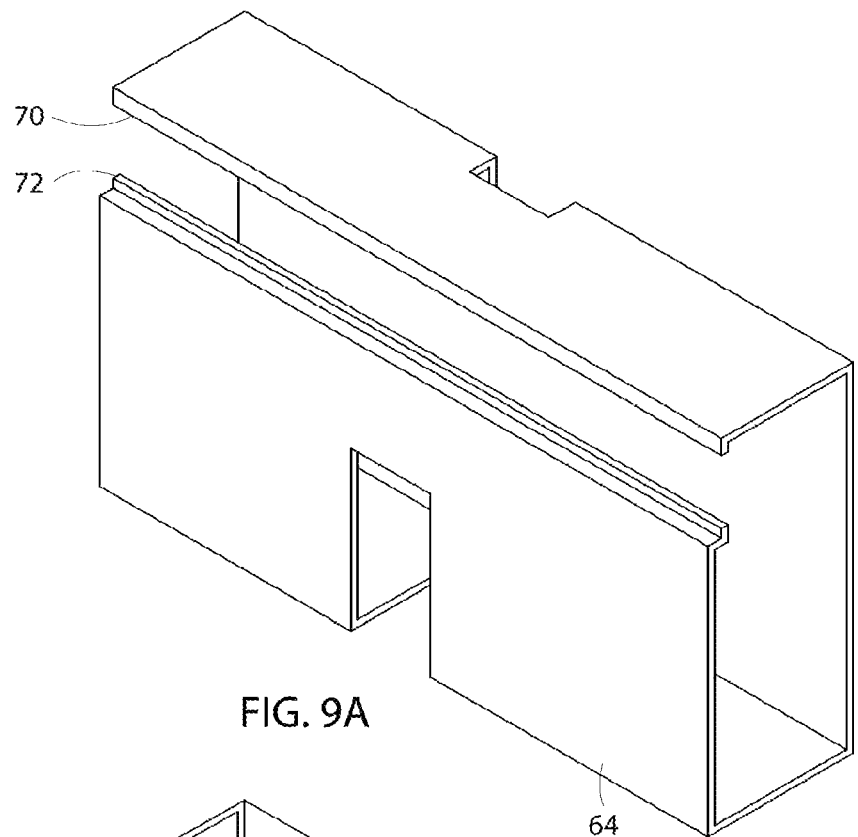
FIG. 9A is an upper rear perspective view of a housing sleeve insert of a housing of the eyeglass apparatus of FIG. 1.
Figure 9B:
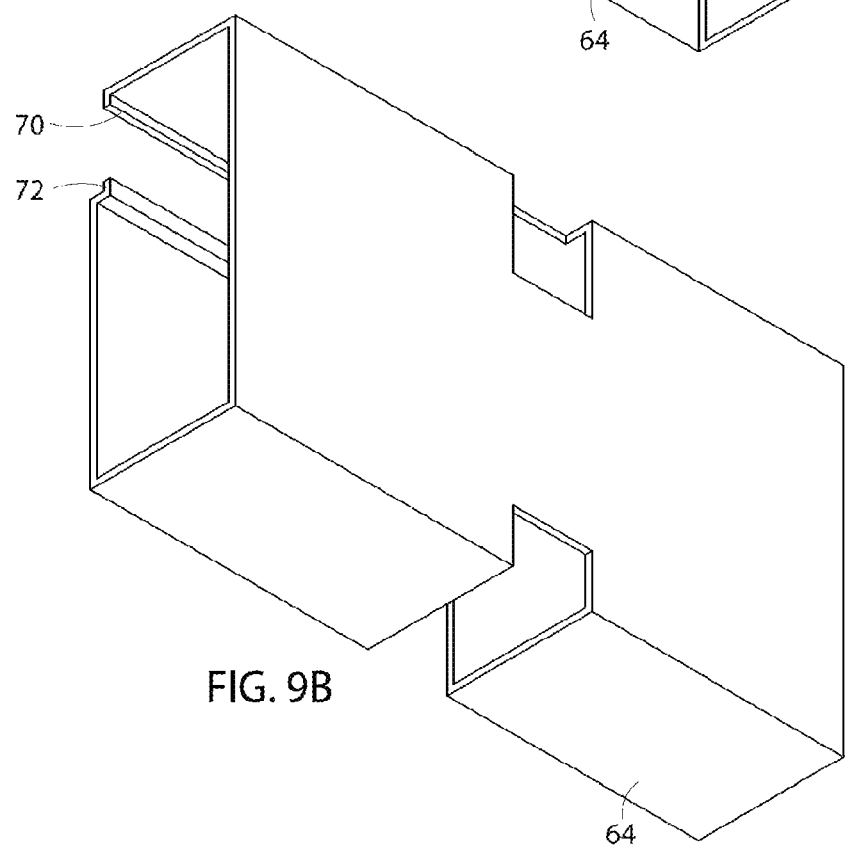
FIG. 9B is a lower front perspective view of the housing sleeve insert of FIG. 9A.
Figure 10:
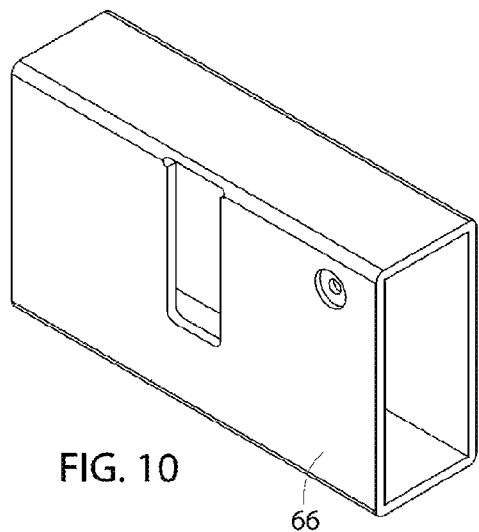
FIG. 10 is a front perspective view of a housing shell of the housing of the eyeglass apparatus of FIG. 1.
Figure 11:
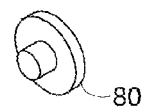
FIG. 11 is a perspective view of a stop pin of the eyeglass apparatus of FIG. 1.
Figure 12:
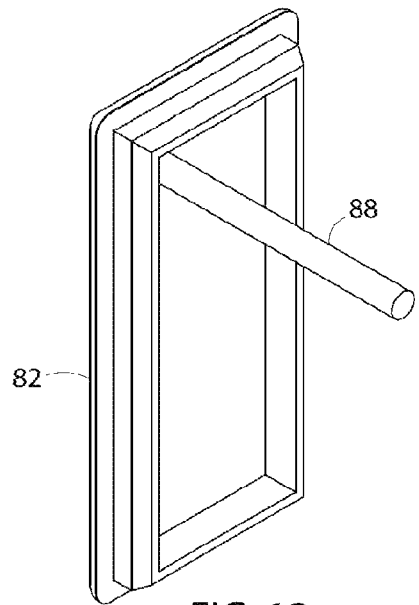
FIG. 12 is a perspective view of a left cap of the eyeglass apparatus of FIG. 1.
Figure 13:
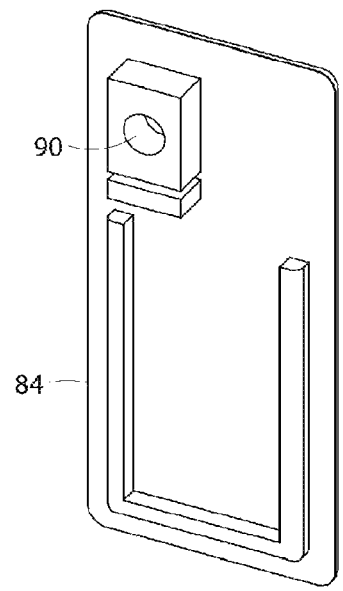
FIG. 13 is a perspective view of a right cap of the eyeglass apparatus of FIG. 1.
Figure 14A:
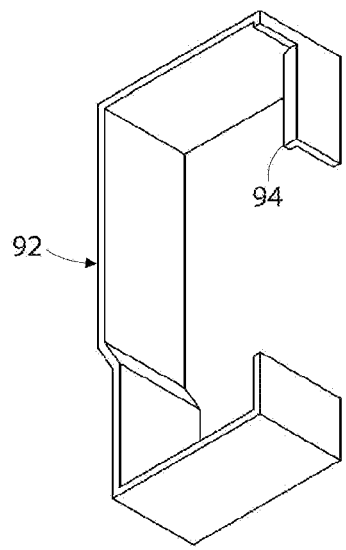
FIG. 14A is a lower front perspective view of a lock mechanism of the eyeglass apparatus of FIG. 1.
Figure 14B:
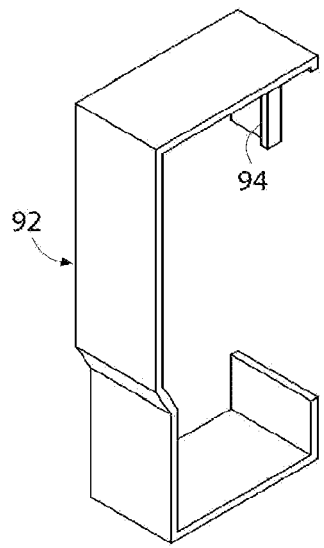
FIG. 14B is an upper rear perspective view of a lock mechanism of FIG. 14A.
Figure 15:
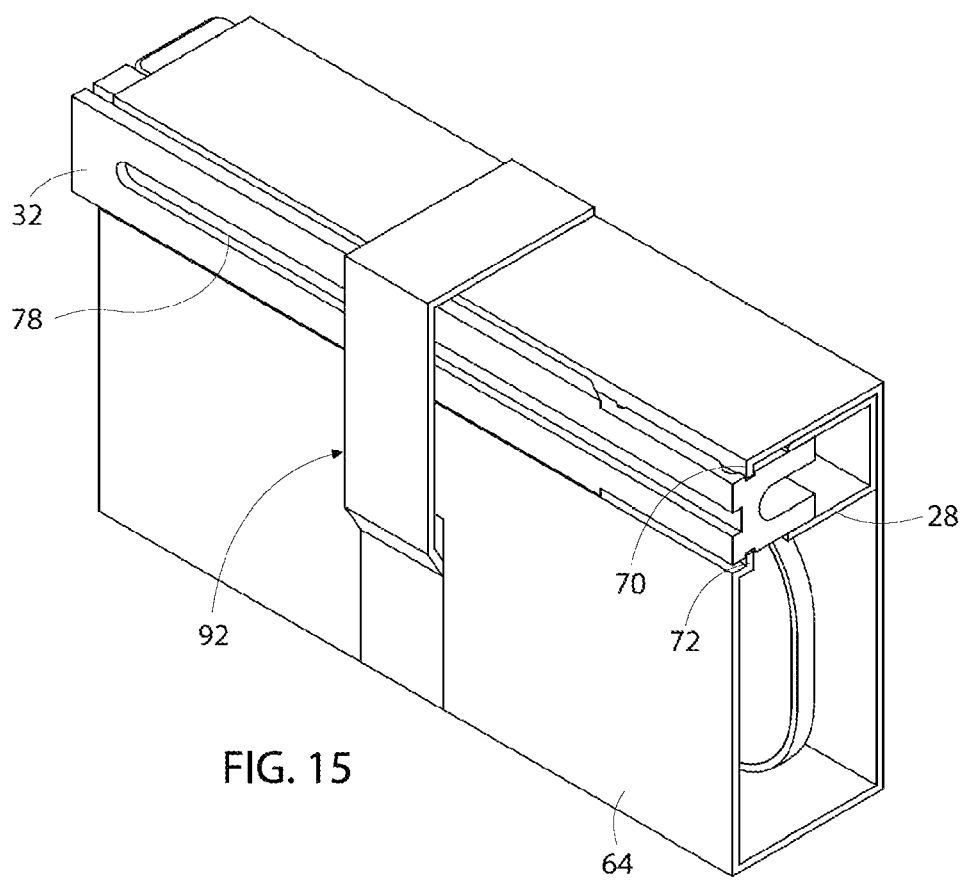
FIG. 15 is a perspective view of the eyeglass apparatus of FIG. 1 in the stowed configuration and is similar to FIG. 1 except the eyeglass apparatus is shown in FIG. 15 without the housing shell, left cap and right cap.

Because of the guide pins and guide channels, the first eyeglass portion 22 and its corresponding first lens portion 26 serially moves at least in a first direction (e.g., in a lateral direction) and then in a second direction (e.g., in an oblique or slanted direction) relative to the second eyeglass portion 24 and its corresponding second lens portion 28 as the eyeglass apparatus transitions from the stowed configuration to the extended configuration. Because the laterally extending portions 52a, 54a, 56a, 58a, are straight and because the obliquely extending portion 52b, 54b, 56b, 58b are straight, the first eyeglass portion 22 moves at least along a first axis, e.g., a lateral axis X1 (FIG. 1), and then along a second axis (e.g., an oblique axis X2) as the eyeglass apparatus 20 transitions from the stowed configuration to the extended configuration. Although a precise mechanism and a precise motion is described in connection with the preferred embodiment, it is to be understood that some alternative mechanism that results in a similar or different motion could be employed without departing from the scope of the invention as set forth in the below claims. As shown in FIGS. 6-8, the first lens portion 26 is forward of the second lens portion 30 when the eyeglass apparatus 20 is in the stowed configuration. As the first lens portion 26 moves toward the extended position along the oblique axis X2—i.e., as the guide pins 42, 44, 46, 48 of the first connector portion 28 ride along the obliquely extending portions 52b, 54b, 56b, 58b of the guide channels 52, 54, 56, 58—the first lens portion 26 moves rearward relative to the second lens portion 30 until the first lens portion is generally aligned with the second lens portion. As shown in FIG. 2, when the eyeglass apparatus 20 is in the extended configuration the first and second lens portions are in a non-overlying configuration with the medial edge portions 34, 38 of the first and second lens portions 26, 30 being between the lateral edge portion 36 of the first lens portion 26 and the lateral edge portion 40 of the second lens portion 30. The eyeglass apparatus 20 is configured such that when the eyeglass apparatus is in the extended configuration the medial portions 34, 38 of the first and second lens portions 26, 30 are spaced to define a nose-receiving region 60 between the medial portions (see FIG. 2).

The eyeglass apparatus 20 also includes a housing, generally indicated at 62, shaped and configured to encase the first and second lens portions 26, 30 when the eyeglass apparatus is in the stowed configuration. The housing 62 includes a housing sleeve insert 64 and a housing shell 66 surrounding the housing sleeve insert. The housing sleeve insert 64 includes upper and lower guide tabs 70, 72. The second connector portion 32 of the second eyeglass portion 24 includes upper and lower guide slots 74, 76 adapted for receiving the first and second guide tabs 70, 72, respectively. The second connector portion 32 rides along the guide tabs 70, 72 of the housing sleeve insert 64 as the second eyeglass portion 24 moves relative to the housing 62 between the stowed configuration (FIGS. 1, 5-8) and the extended configuration (FIG. 2). The second connector portion 32 further includes a limit slot 78 in a rearward facing surface of the second connector portion. The eyeglass apparatus 20 further includes a stop pin 80 extending from the housing shell 66 into the limit slot 78. When the eyeglass apparatus 20 is in the extended configuration, the stop pin 80 engages the second connector portion 32 at an end of the limit slot 78 (e.g., the left-most end of the slot as viewed in FIG. 4A) to prevent the second connector portion from disconnecting from the housing sleeve insert 64.

The eyeglass apparatus 20 further includes a left cap 82 and a right cap 84. The left cap 82 is fixed to an end (left end as viewed in FIGS. 5 and 6) of the housing shell 66 of the housing 62. The right cap 84 is fixed to an end of the first connector portion 28 of the first eyeglass portion 22. The right cap 84 covers an end (right end as viewed in FIGS. 5 and 6) of the housing shell 66 when the eyeglass apparatus 20 is in the stowed configuration. The eyeglass apparatus 20 also includes a spring 86 or other suitable biasing member for urging the eyeglass apparatus 20 toward the extended configuration. The spring 86 may be a helical spring such as a spring-tempered steel compression spring of the type commercially available from McMaster-Carr, part number 9662K12 (cut to a suitable length). The left cap 82 includes a stem 88 for holding a left end of the spring 86. The right cap 84 includes a bore 90 in the right cap 84 for holding a right end of the spring 86.

The eyeglass apparatus 20 further includes a lock mechanism 92. The lock mechanism 92 is a generally C-shaped member having a lower portion sized to fit within a slot in the housing sleeve insert 64. As shown in FIGS. 6-8, the lower portion of the lock mechanism 92 is generally flush with the housing sleeve insert 64 and sufficiently snug within the housing shell 66 such that the lower portion of the lock mechanism 92 is generally fixed relative to the housing sleeve insert and the housing shell. An upper portion of the lock mechanism 92 is resiliently moveable between a locked position (FIG. 7) and an unlocked position (FIG. 8). The upper portion of the lock mechanism 92 includes a locking tab 94 sized and shaped to selectively interlock in a locking groove 96 in a forward facing surface of the first connector portion 28. The lock mechanism 92 is shaped such that it is biased toward the locked position. When the eyeglass apparatus 20 is in the stowed configuration and the lock mechanism 92 is in the locked position, the locking tab 94 extends into the locking groove 96 and counteracts the biasing force of the spring 86 to lock the eyeglass apparatus in the stowed configuration.

To use the eyeglass apparatus 22, an individual presses against a rearward facing surface of the upper portion of the lock mechanism 92 to resiliently move the upper portion to the unlocked position to thereby disengage the locking tab 94 from the locking groove 96. Upon the disengagement of the locking tab 94 from the locking groove 96, the spring 86 urges the first eyeglass portion 22 laterally away from the housing 62 until the end of the limit slot 78 of the second connector portion 32 abuts the stop pin 80, thereby transitioning the eyeglass apparatus 20 to the extended configuration. When in the extended position, the eyeglass apparatus 20 may be positioned near the eyes of the individual to enable the individual to simultaneously look through the first lens portion 26 with one of the individual's eyes and look through the second lens portion 30 with the other of the individual's eyes. To transition the eyeglass apparatus 22 from the extended configuration to the stowed configuration, the right cap 84 may be pushed laterally until the right cap is adjacent the end of the housing. As the locking groove 96 of the lock mechanism 92 aligns with the locking tab 94, the biasing of the lock mechanism urges the locking tab into the groove and to the locked position to retain the eyeglass apparatus 20 in the stowed configuration.

Another embodiment of a collapsible eyeglass apparatus 100 is shown in FIGS. 16-21. Like the previously described eyeglass apparatus, this eyeglass apparatus 100 comprises a first eyeglass portion 102, which comprises a first lens portion 104 and a first connector portion 106. The eyeglass apparatus 100 further comprises a second eyeglass portion 108, which comprises a second lens portion 110 and a second connector portion 112. And like the previously described eyeglass apparatus, the first and second connector portions 106, 112 are connected to each other in a manner allowing the eyeglass apparatus 100 to transition between a stowed configuration, wherein the first and second lens portions 104, 110 overlay each other, and an extended configuration, wherein the first and second lens portions do not overlay each other.

The eyeglass apparatus 100 shown in FIGS. 16-21 does comprise unique features that are not present in the previously described embodiment. The first eyeglass portion 102 comprises a first link 114 and the first connector portion 106 partially defines a first channel 116. Likewise, the second eyeglass portion 108 comprises a second link 118 and the second connector portion 106 defines a second channel 120. The first channel 116 is also partially defined by the first lens portion 104 and extends into the front 122 of the eyeglass apparatus 100. Conversely, the second channel 116 extends into the rear 124 of the eyeglass apparatus 100. The first link 114 is pivotally attached to the first connector portion 106 adjacent the medial edge of the first connector portion. Likewise, the second link 118 is pivotally attached to the second connector portion 112 adjacent the medial edge of the second connector portion. Each of the links 114, 118 comprises a slender beam 126 that extends from its pivot. A bulbous head 128 is formed at the end of the beam opposite the pivot. The bulbous head 128 of the first link 114 is slideably trapped in the second channel 120 of the second eyeglass portion 108, with the beam 126 of the first link extending out of the channel. Conversely, the bulbous head 128 of the second link 118 is slideably trapped in the first channel 116 of the first eyeglass portion 102. As seen best in the cutaway view shown in FIG. 19, this allows the first and second eyeglass portions 102, 108 to translate relative to each other to thereby adjust the eyeglass apparatus 100 between its stowed and extended configurations.

Figure 16:
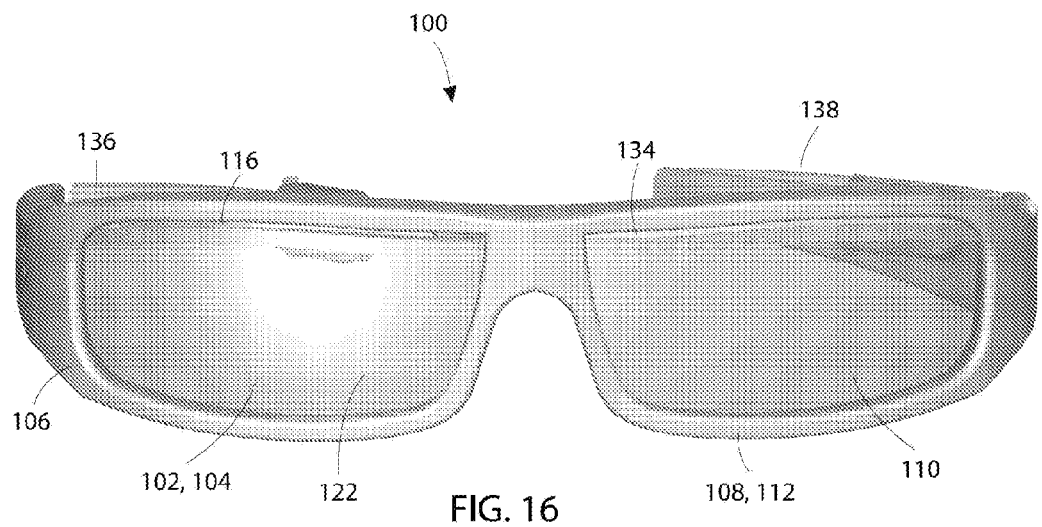
FIG. 16 is a perspective view of another embodiment of a collapsible eyeglass apparatus shown in its extended configuration.
Figure 17:
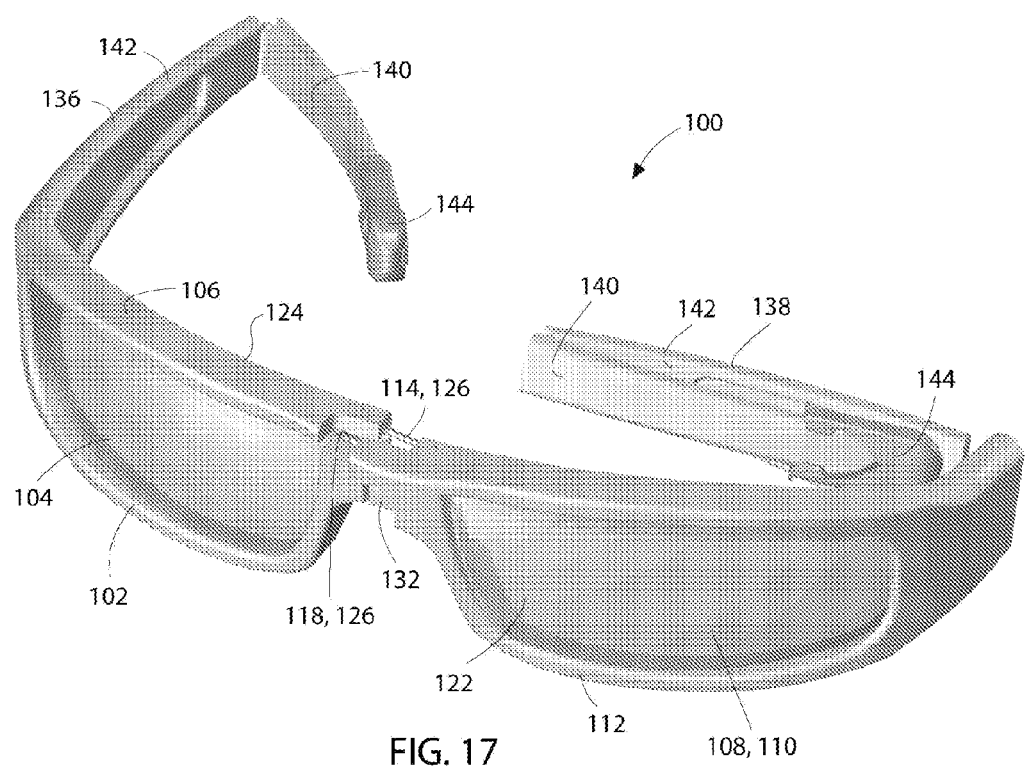
FIG. 17 is a perspective view of the eyeglass apparatus shown in FIG. 16 shown in transition from its extended to stowed configurations.
Figure 18:
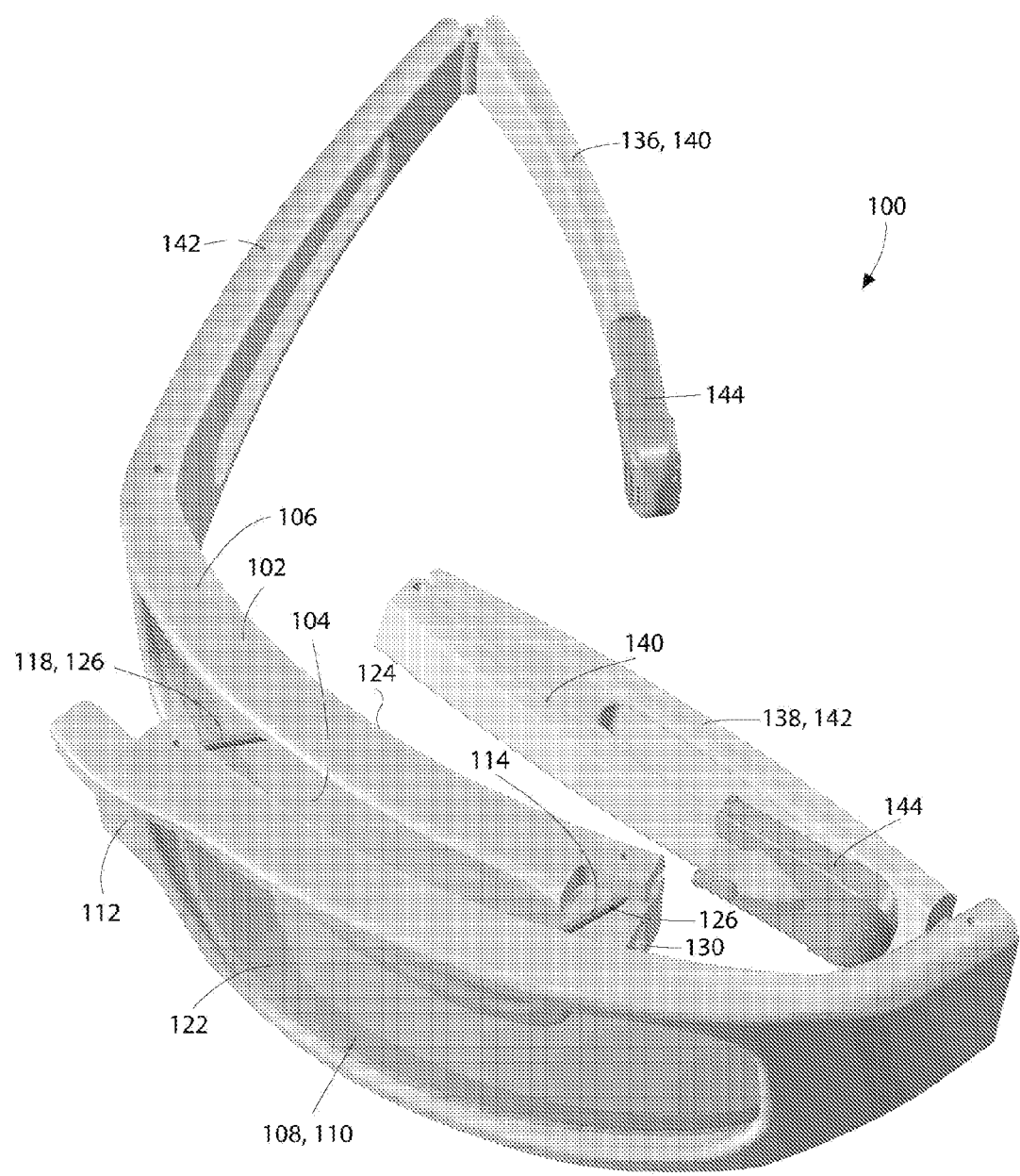
FIG. 18 is a perspective view of the eyeglass apparatus shown in FIGS. 16 and 17 shown further along in transition from its extended to stowed configurations.
Figure 19:
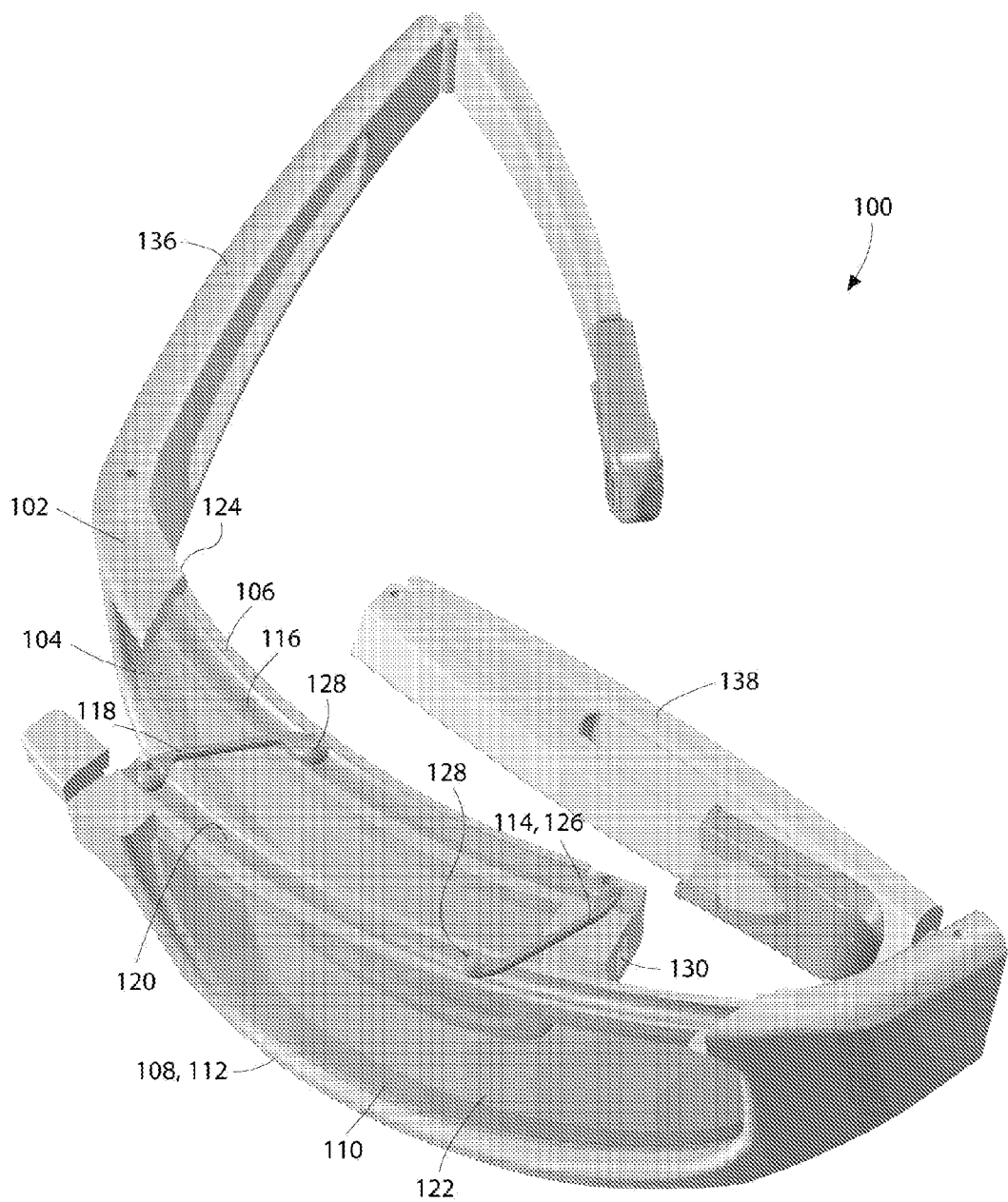
FIG. 19 is a perspective view like FIG. 18, but is shown with portions of its connector portions cut-away to reveal the channels of the connector portions.

When adjusting the eyeglass apparatus 100 into its extended configuration, the bulbous heads 128 of the links 114, 118 eventually reach the end of the channels 116, 120, as shown in FIG. 17. At this point, the first eyeglass portion 102 is able to swing forward relative to the second eyeglass portion 108, to align said eyeglass portions side-by-side and slightly spaced apart. The medial end of first connector portion 106 comprises a female socket fitting 130 that comprises magnetic material. The medial end of the second connector portion 112 comprises a magnet that forms a corresponding male fitting 132. With the eyeglass portions 102, 108 aligned side-by-side, the male fitting 132 can be inserted into the female fitting 130, thereby closing the gap between the eyeglass portions 102, 108. The magnetic attraction between the fittings 130, 132 then releasably secures the eyeglass apparatus 100 in its extended configuration, as shown in FIG. 16.

When the eyeglass apparatus 100 is in its extended configuration, the front 122 of the eyeglass apparatus has a contiguous surface contour such that the first and second connector portions 106, 112 appear to be a single monolithic part. This conceals the fact that the eyeglass apparatus 100 is collapsible and adds to its aesthetic appeal. Notably, the first channel 116 is formed by both the first connector portion 106 and the first lens portion 104 (the top edge of the first lens portion prevents the bulbous head 128 of the second link 118 from exiting the first channel). This camouflages the first channel 116 such that it does not distract from the aesthetic appeal of the eyeglass apparatus 100. Moreover, a similar and symmetric false channel 134 is formed into the second eyeglass portion 108 between the second connector portion 112 and the second lens portion 110. As such, the front of the eyeglass apparatus 100 is symmetric and the first and false channels 116, 134 appear to be only stylistic and esthetic elements.

Figure 20:
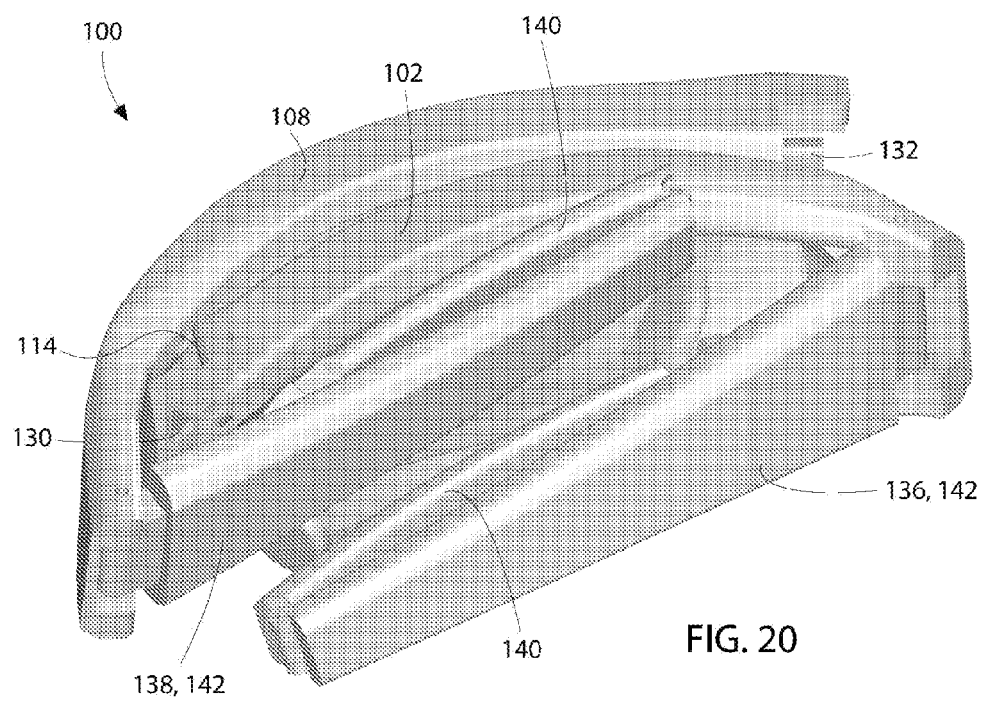
FIG. 20 is a perspective view of the eyeglass apparatus shown in FIGS. 16-19 shown in its stowed configuration.
Figure 21:
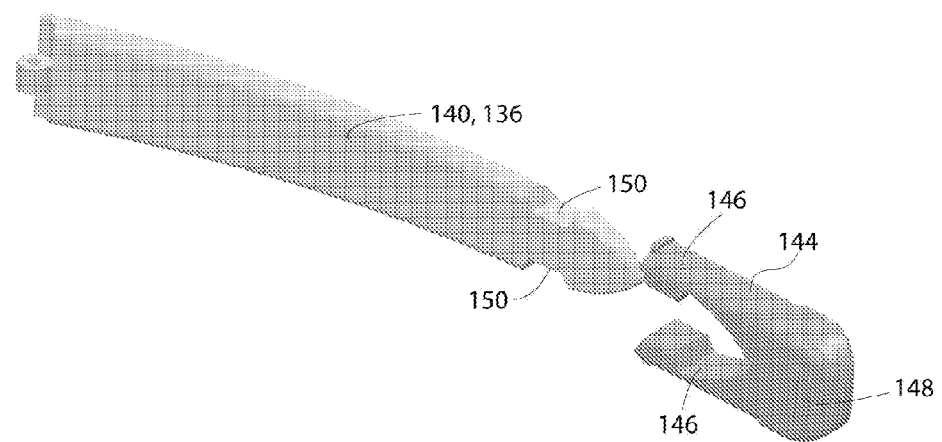
FIG. 21 is a detail exploded perspective view of the lanyard clip and the distal portion of one of the temple portions of the eyeglass apparatus shown in FIGS. 16-20.

The eyeglass apparatus 100 further comprises first and second temple portions 136, 138 that are adapted and configured to partially support the eyeglass apparatus from a wearer's ears. The first temple portion 136 is pivotally connected to the lateral end of the first eyeglass portion 102, and the second temple portion 138 is pivotally connected to the lateral end of the second eyeglass portion 108. Like traditional eyeglass temple portions, the pivot axes of the first and second temple portions 136, 138 are slightly skewed relative to each other such that they can be folded against the eyeglass portions 102, 108 without interfering with each other. Unlike traditional temple portions, each of the temple portions 136, 138 of the eyeglass apparatus 100 preferably comprises another hinge that connects a distal portion 140 of the temple portion to its proximal portion 142 (the proximal portion being the portion that is pivotally attached to the respective eyeglass portion 102, 108). This allows the temple portions 136, 138 to be stowed more compactly when the eyeglass apparatus 100 is in its stowed configuration (as is shown in FIG. 20). As shown, the skew of the pivot axes of the first and second temple portions 136, 138 is preferably configured such that the temple portions 136, 138 lay one above the other when the eyeglass apparatus 100 is in its stowed configuration. This is in contrast to typical eyeglass apparatus, which typically have temple portions that cross over each other when folded.

Figure 22:
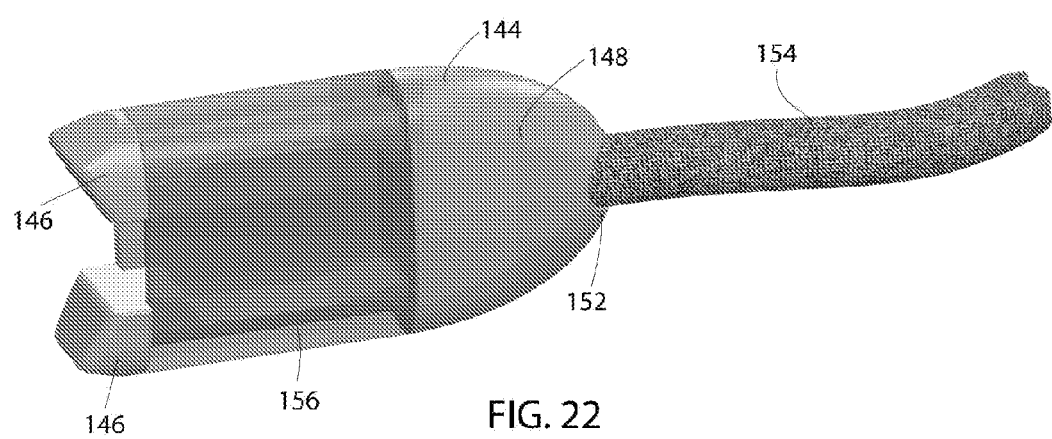
FIG. 22 is perspective view of a lanyard clip attached to a lanyard string and is shown with its resilient sheath.

Another aspect of the eyeglass apparatus 100, which could also be incorporated into more traditional eyeglass apparatus that don't have collapsible eyeglass portions, pertains to unique lanyard clips 144 and corresponding geometry on the distal most ends of the temple portions 136, 138. As shown in FIG. 22, the lanyard clip 144 is formed of plastic and comprises a pair of resilient locking tangs 146 that extend from a main body portion 148. The distal most ends of the temple portions 136, 138, comprise recesses 150. The lanyard clip 144 is configured such that it can be releasably snap-fit onto either of the temple portions 136, 138 of the eyeglass apparatus 100 by gently, longitudinally forcing the lanyard clip against the distal most ends of the temple portions. During this process the locking tangs 146 of the lanyard clip 144 resiliently spread apart as they engage the ends of the temple portion 136 until they reach the recesses 150 formed in the temple portion, where thereafter they resiliently snap back toward each other, thereby interlocking the lanyard clip to the temple portion. As shown in FIG. 22, the lanyard clip 144 preferably comprises a rear opening 152 through which a lanyard string or cord 154 extends. The lanyard clip 144 also comprises a resilient sleeve 156 (shown semi-transparent) that encircles the locking tangs 146. The resilient sleeve 156 is configured and adapted to resiliently stretch when the locking tangs 146 spread apart. The resilient sleeve 156 also prevents the lanyard clip 144 from slipping transversely off of the temple portion 136 when the lanyard clip is attached thereto. Furthermore, the resilient sleeve 156 is aesthetically pleasing and simplifies the fabrication of the lanyard clips 144. Optional rubber or polymeric caps (not shown) are also preferably provided with the eyeglass apparatus 100 that are configured and adapted to attach to the distal ends temple portions 136, 138 to cover the recesses 150 of the temple portions when a wearer does not have a lanyard attached to the eyeglass apparatus.

In view of the foregoing, it should be appreciated that the invention achieves several advantages over prior art eyeglass mechanisms.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. An eyeglass apparatus comprising:
a left eyeglass portion comprising a first portion;
a right eyeglass portion comprising a second portion;
a first link slidably connected to one of said left eyeglass portion and said right eyeglass portion and pivotally connected to at least one of said left eyeglass portion and said right eyeglass portion; and
a second link connected to said left eyeglass portion and said right eyeglass portion.

2. An eyeglass apparatus in accordance with claim 1, wherein said first link is pivotally connected to the other of said one of said left eyeglass portion and said right eyeglass portion.

3. An eyeglass apparatus in accordance with claim 1, wherein said first link is slidably and pivotally connected to said one of said left eyeglass portion and said right eyeglass portion and pivotally connected to the other of said one of said left eyeglass portion and said right eyeglass portion.

4. An eyeglass apparatus in accordance with claim 1, wherein said second link is slidably connected to one of said left eyeglass portion and said right eyeglass portion and pivotally connected to one of said left eyeglass portion and said right eyeglass portion.

5. An eyeglass apparatus in accordance with claim 1, wherein said second link is pivotally connected to said one of said left eyeglass portion and said right eyeglass portion and slidably connected to the other of said one of said left eyeglass portion and said right eyeglass portion.

6. An eyeglass apparatus in accordance with claim 1, wherein said first link is slidably and pivotally connected to said one of said left eyeglass portion and said right eyeglass portion and pivotally coupled to the other of said left eyeglass portion and said right eyeglass portion, and said second link is slidably and pivotally connected to said other of said left eyeglass portion and said right eyeglass portion and pivotally connected to said one of said left eyeglass portion and said right eyeglass portion.

7. An eyeglass apparatus in accordance with claim 1, wherein one of said first portion and said second portion includes a plug and the other of said first portion and said second portion includes a socket, said plug configured to extend within said socket in a first eyeglass apparatus orientation and configured to be decoupled from said socket in a second eyeglass apparatus orientation.

8. An eyeglass apparatus in accordance with claim 1, wherein said eyeglass apparatus configured to transition from a first eyeglass apparatus orientation, in which said first portion contacts said second portion along a first axis, to a second eyeglass apparatus orientation, in which said left eyeglass portion is spaced from said right eyeglass portion along a second axis that is substantially perpendicular to the first axis.

9. An eyeglass apparatus in accordance with claim 8, further comprising a front and a back, said second axis substantially parallel to a line extending from said front to said back.

10. An eyeglass apparatus in accordance with claim 9, wherein each of said left eyeglass portion and said right eyeglass portion comprises a first side and a second side, said eyeglass apparatus further comprising a left temple member extending from said left eyeglass portion second side substantially parallel to said second axis, and a right temple member extending from said right eyeglass portion second side substantially parallel to said second axis.

11. An eyeglass apparatus in accordance with claim 1, wherein said first link is slidably connected to said at least one of said left eyeglass portion and said right eyeglass portion.

12. An eyeglass apparatus comprising:
a left eyeglass portion comprising a first portion;
a right eyeglass portion comprising a second portion, one of said first portion and said second portion includes a socket and the other of said first portion and said second portion includes a plug configured to extend within said socket;
a first link slidably connected to one of said left eyeglass portion and said right eyeglass portion and pivotally connected to at least one of said left eyeglass portion and said right eyeglass portion; and
a second link connected to said left eyeglass portion and said right eyeglass portion.

13. An eyeglass apparatus in accordance with claim 12, wherein said first link is pivotally connected to the other of said left eyeglass portion and said right eyeglass portion.

14. An eyeglass apparatus in accordance with claim 12, wherein said first link is slidably and pivotally connected to said one of said left eyeglass portion and said right eyeglass portion and pivotally connected to the other of said one of said left eyeglass portion and said right eyeglass portion.

15. An eyeglass apparatus in accordance with claim 12, wherein said second link is slidably connected to one of said left eyeglass portion and said right eyeglass portion and pivotally connected to at least one of said left first eyeglass portion and said right eyeglass portion.

16. An eyeglass apparatus in accordance with claim 12, wherein said second link is pivotally connected to one of said left eyeglass portion and said right eyeglass portion and slidably connected to the other of said one of said left eyeglass portion and said right eyeglass portion.

17. An eyeglass apparatus in accordance with claim 12, wherein said first link is slidably and pivotally connected to said one of said left eyeglass portion and said right eyeglass portion and pivotally coupled to the other of said left eyeglass portion and said right eyeglass portion, and said second link is slidably and pivotally connected to said other of said left eyeglass portion and said right eyeglass portion and pivotally connected to said one of said left eyeglass portion and said right eyeglass portion.

18. An eyeglass apparatus in accordance with claim 12, wherein said eyeglass apparatus is configured to transition from a first eyeglass apparatus orientation, in which said left eyeglass portion contacts said right eyeglass portion along a first axis, to a second eyeglass apparatus orientation, in which said left eyeglass portion is spaced from said right eyeglass portion along a second axis that is substantially perpendicular to the first axis.

19. An eyeglass apparatus in accordance with claim 18, further comprising a front and a back, said second axis substantially parallel to a line extending from said front to said back.

20. An eyeglass apparatus in accordance with claim 19, wherein said first link and said second link are not visible when viewed from said front when said eyeglass apparatus is in said first eyeglass apparatus orientation.

21. An eyeglass apparatus in accordance with claim 18, wherein each of said left eyeglass portion and said right eyeglass portion comprises a first side and a second side, said eyeglass apparatus further comprising a left temple member extending from said left eyeglass portion second side, and a right temple member extending from said right eyeglass portion second side.

22. An eyeglass apparatus in accordance with claim 12, wherein said first link is slidably connected to said at least one of said left eyeglass portion and said right eyeglass portion.

23. An eyeglass apparatus comprising:
a left eyeglass portion;
a right eyeglass portion;
a first link slidably connected to one of said left eyeglass portion and said right eyeglass portion and pivotally connected to the other of said left eyeglass portion and said right eyeglass portion; and
a second link connected to said left eyeglass portion and said right eyeglass portion.

24. An eyeglass apparatus comprising:
a left eyeglass portion;
a right eyeglass portion;
a first link slidably connected to one of said left eyeglass portion and said right eyeglass portion and pivotally connected to said left eyeglass portion and said right eyeglass portion; and
a second link connected to said left eyeglass portion and said right eyeglass portion.

25. An eyeglass apparatus comprising:
a left eyeglass portion;
a right eyeglass portion;
a first link slidably and pivotally connected to one of said left eyeglass portion and said right eyeglass; and
a second link connected to said left eyeglass portion and said right eyeglass portion.

26. An eyeglass apparatus comprising:
a left eyeglass portion comprising a first portion;
a right eyeglass portion comprising a second portion, one of said first portion and said second portion includes a socket and the other of said first portion and said second portion includes a plug configured to extend within said socket;
a first link slidably connected to one of said left eyeglass portion and said right eyeglass portion and pivotally connected to the other of said left eyeglass portion and said right eyeglass portion; and
a second link connected to said left eyeglass portion and said right eyeglass portion.

27. An eyeglass apparatus comprising:
a left eyeglass portion comprising a first portion;
a right eyeglass portion comprising a second portion, one of said first portion and said second portion includes a socket and the other of said first portion and said second portion includes a plug configured to extend within said socket;
a first link slidably connected to one of said left eyeglass portion and said right eyeglass portion and pivotally connected to said left eyeglass portion and said right eyeglass portion; and
a second link connected to said left eyeglass portion and said right eyeglass portion.

28. An eyeglass apparatus comprising:
a left eyeglass portion comprising a first portion;
a right eyeglass portion comprising a second portion, one of said first portion and said second portion includes a socket and the other of said first portion and said second portion includes a plug configured to extend within said socket;
a first link slidably and pivotally connected to one of said left eyeglass portion and said right eyeglass portion; and
a second link connected to said left eyeglass portion and said right eyeglass portion.

\* \* \* \* \*